United States Patent
Kim

(10) Patent No.: US 9,732,683 B2
(45) Date of Patent: Aug. 15, 2017

(54) MOTOR RESPONSE CONTROL METHOD IN VARIABLE CHARGE MOTION SYSTEM

(71) Applicants: HYUNDAI MOTOR COMPANY, Seoul (KR); Kia Motors Corporation, Seoul (KR)

(72) Inventor: Young-Min Kim, Yongin-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 81 days.

(21) Appl. No.: 14/817,065

(22) Filed: Aug. 3, 2015

(65) Prior Publication Data

US 2016/0108829 A1 Apr. 21, 2016

(30) Foreign Application Priority Data

Oct. 16, 2014 (KR) .......................... 10-2014-0139593

(51) Int. Cl.
*F02M 29/00* (2006.01)
*F02M 7/00* (2006.01)
*F02D 41/00* (2006.01)
*F02D 41/20* (2006.01)
*F02M 35/10* (2006.01)
(Continued)

(52) U.S. Cl.
CPC .......... *F02D 41/0002* (2013.01); *F02B 31/00* (2013.01); *F02D 41/20* (2013.01); *F02M 35/10255* (2013.01); *F02B 1/06* (2013.01); *F02B 2023/106* (2013.01); *F02D 41/2464* (2013.01); *F02D 2041/0015* (2013.01); *F02D 2041/2027* (2013.01); *F02D 2200/0406* (2013.01); *F02D 2200/101* (2013.01); *F02M 27/08* (2013.01); *F02M 29/04* (2013.01); (Continued)

(58) Field of Classification Search
CPC .......... F02B 1/06; F02M 29/04; F02M 29/06; F02M 27/08; F02D 2041/0015; F02D 2041/2027; F02D 2200/501
USPC .................................................. 123/590, 436
See application file for complete search history.

(56) References Cited

U.S. PATENT DOCUMENTS 4,982,710 A    1/1991  Ohta et al.
5,979,401 A *  11/1999 Hickey ................... F02B 31/00
                                                    123/306

(Continued)

FOREIGN PATENT DOCUMENTS

JP    63-143357 A    6/1988
JP    09-154299 A    6/1997
(Continued)

*Primary Examiner* — Jacob Amick
*Assistant Examiner* — Charles Brauch
(74) *Attorney, Agent, or Firm* — McDermott Will & Emery LLP

(57) ABSTRACT

A motor response control method in a variable charge motion system in which a VCM motor is differentially controlled by a PWM duty regardless of back pressure of intake air in an intake manifold when a current engine rotation speed in revolutions per minute is less than a specific engine rotation speed in revolutions per minute in a VCM position learning state by a controller whereas the VCM motor is differentially controlled by the PWM duty based on the back pressure of intake air in the intake manifold when the current engine rotation speed in revolutions per minute is greater than the specific engine rotation speed in revolutions per minute.

7 Claims, 4 Drawing Sheets

(51) Int. Cl.

| | | |
|---|---|---|
| | *F02B 31/00* | (2006.01) |
| | *F02M 29/06* | (2006.01) |
| | *F02M 27/08* | (2006.01) |
| | *F02B 1/06* | (2006.01) |
| | *F02M 29/04* | (2006.01) |
| | *F02D 41/24* | (2006.01) |
| | *F02B 23/10* | (2006.01) |

(52) U.S. Cl.
CPC ............ *F02M 29/06* (2013.01); *Y02T 10/146* (2013.01); *Y02T 10/42* (2013.01)

(56) References Cited

U.S. PATENT DOCUMENTS

| | | | |
|---|---|---|---|
| 6,034,500 A | * | 3/2000 | Nagase ................. F02D 41/221 123/361 |
| 8,150,601 B2 | | 4/2012 | Kawamura et al. |
| 2002/0092508 A1 | * | 7/2002 | Kanekawa ............. F02M 31/02 123/543 |

FOREIGN PATENT DOCUMENTS

| | | |
|---|---|---|
| JP | 2004-116457 A | 4/2004 |
| JP | 2011-001844 A | 1/2011 |
| KR | 10-0509145 B1 | 8/2005 |
| KR | 10-0764494 B1 | 1/2007 |
| KR | 10-2009-0063912 A | 6/2009 |
| KR | 10-2013-0051830 A | 5/2013 |
| KR | 10-2013-0061583 A | 6/2013 |

* cited by examiner $$u(t) = MV(t) = K_p e(t) + K_i + K_i \int_0^t e(\tau)d\tau + K_d \frac{d}{dt} e(t)$$

PID CONTROL BLOCK EXAMPLE

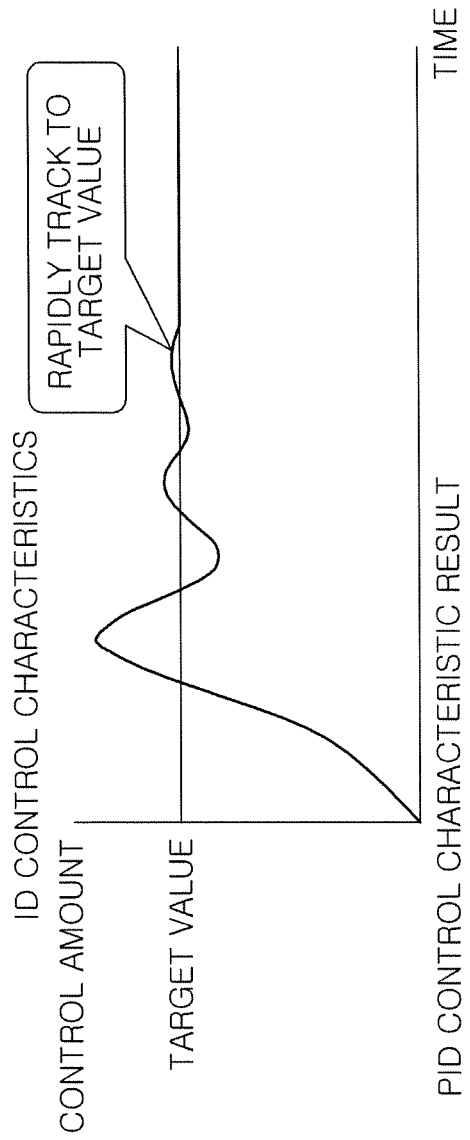

MOTOR RESPONSE CONTROL METHOD IN VARIABLE CHARGE MOTION SYSTEM

CROSS-REFERENCE(S) TO RELATED APPLICATIONS

This application claims the benefit of priority to Korean Patent Application No. 10-2014-0139593, filed on Oct. 16, 2014, which is incorporated herein by reference in its entirety.

TECHNICAL FIELD

Exemplary embodiments of the present invention relate to a variable charge motion system; and, particularly, to a motor response control method in which a motor is differentially controlled in consideration of back pressure of intake air.

BACKGROUND

In recent years, reinforced environmental regulations have required that various fuel efficiency improvement devices or methods applied to vehicles have improved performance. Particularly, a need to meet the environmental regulations is further increased due to an increase in oil cost.

Such satisfaction of conditions may be realized by improving combustion characteristics of an engine. This realization technique includes, for example, a variable charge motion (hereinafter, referred to as "VCM") system which satisfactorily mixes fuel and air in a cylinder by generating a tumble in intake air.

The VCM system includes a VCM motor, a VCM valve provided on an intake air passage of an intake manifold, a linkage link connecting a DC motor type VCM motor to the VCM valve, and an ECU for controlling the VCM motor. Hereinafter, the VCM is referred to as "link type VCM".

When the link type VCM is operated, a position of the VCM motor is feedback controlled together with PID control by the ECU, movement of the VCM valve by the VCM motor varies the intake air passage of the intake manifold, and the tumble is generated in the intake air by a change in cross section of the intake air passage of the intake manifold, thereby allowing a mixture ratio of air and fuel to be further improved in the cylinder so as to improve combustion characteristics.

In particular, the ECU controls the VCM motor by a PWM (Pulse Width Modulation) duty linked with a change of an engine intake amount (engine mapping variable) when the PID control is performed, thereby most rapidly tracking a target position of the VCM motor.

However, the VCM motor has a response speed of about 150 m/sec and is controlled so as to reach a target by motor duty reduction occurring after reaching a target position by the PWM duty of differential control (D) of PID having integral/differential concepts. Thus, signal vibration may be caused by noise generated when the VCM motor does not rapidly reach the target position.

In particular, since the VCM motor is connected to the VCM valve by the link, the VCM motor is influenced by back pressure of intake air flowing in the intake air passage of the intake manifold. For this reason, when the VCM motor does not rapidly reach the target after reaching the target position, noise vibration of duty reduction signals may be caused.

Therefore, when the differential control PWM duty for improving the response speed is improperly set, the VCM motor may be seriously influenced by disturbance or noise. Particularly, when the VCM motor is used at a temperature exceeding a critical temperature (about 200° C. or more) by excessive use of the PWM duty, coils of the VCM motor may be damaged.

SUMMARY

An embodiment of the present invention is directed to a motor response control method in a variable charge motion system in which a differential control PWM duty is applied to a VCM motor connected to a VCM valve in consideration of resistance force by back pressure of intake air in an intake manifold so as to resolve PWM duty signal vibration, and particularly the differential control PWM duty is increased or decreased in consideration of closing and opening conditions of the VCM valve so as to perform rapid response control when the VCM motor reaches a target position.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an embodiment of the present invention, a motor response control method in a variable charge motion system includes (A) applying a first PWM (Pulse Width Modulation) duty to a VCM motor to determine whether a current engine rotation speed in revolutions per minute is greater than a specific engine rotation speed in revolutions per minute in a VCM position learning completion state by a controller configured to differentially control the VCM motor, (B) determining whether response of the VCM motor is influenced by back pressure of intake air in an intake manifold due to a magnitude relation between the current engine rotation speed in revolutions per minute and the specific engine rotation speed in revolutions per minute, (C) applying a typical normal PWM duty regardless of the back pressure of intake air to the VCM motor when the current engine rotation speed in revolutions per minute is less than the specific engine rotation speed in revolutions per minute, and (D) applying a rapid response PWM duty based on the back pressure of intake air to the VCM motor when the current engine rotation speed in revolutions per minute is greater than the specific engine rotation speed in revolutions per minute.

In certain embodiments, the first PWM duty applied by the controller in the VCM position learning completion state may be 90%. In certain embodiments, the specific engine rotation speed in revolutions per minute may be 1500 RPM.

In certain embodiments, the typical normal PWM duty may have a magnitude of 30% to 65% PWM duty applied to the VCM motor. In certain embodiments, a magnitude of 30% PWM duty applied to the VCM motor may be set as a criteria in the rapid response PWM duty, and the magnitude of the rapid response PWM duty may be greater than the 30% PWM duty when the VCM motor closes a VCM valve installed on an intake air passage of the intake manifold whereas the magnitude of the rapid response PWM duty may be less than the 30% PWM duty when the VCM motor opens the VCM valve. In certain embodiments, the magnitude of the PWM duty which is greater or less than the 30% PWM duty may be varied according to the current engine rotation speed in revolutions per minute.

In certain embodiments, the back pressure of intake air may be formed by a flow of outside air introduced from the atmosphere or a flow of outside air mixed with EGR (Exhaust Gas Recirculation) gas.

BRIEF DESCRIPTION OF THE DRAWINGS

FIGS. 3A and 3B illustrate an example of PID control realized when the motor response control according to the embodiment of the present invention is performed.

DETAILED DESCRIPTION

Figure 1:
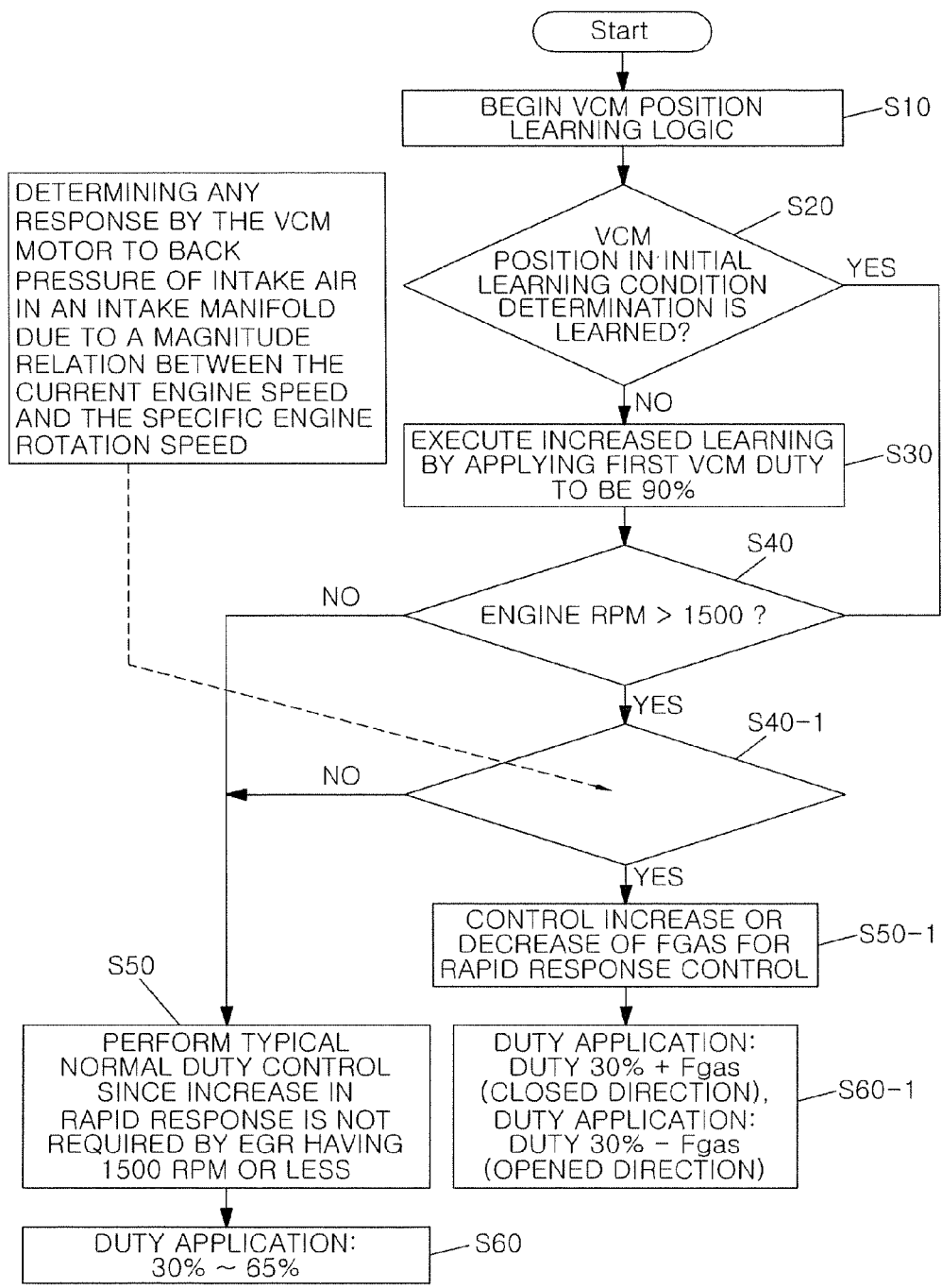
FIG. 1 is a flowchart illustrating a motor response control method in a variable charge motion system according to an embodiment of the present invention.

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

Figure 2:
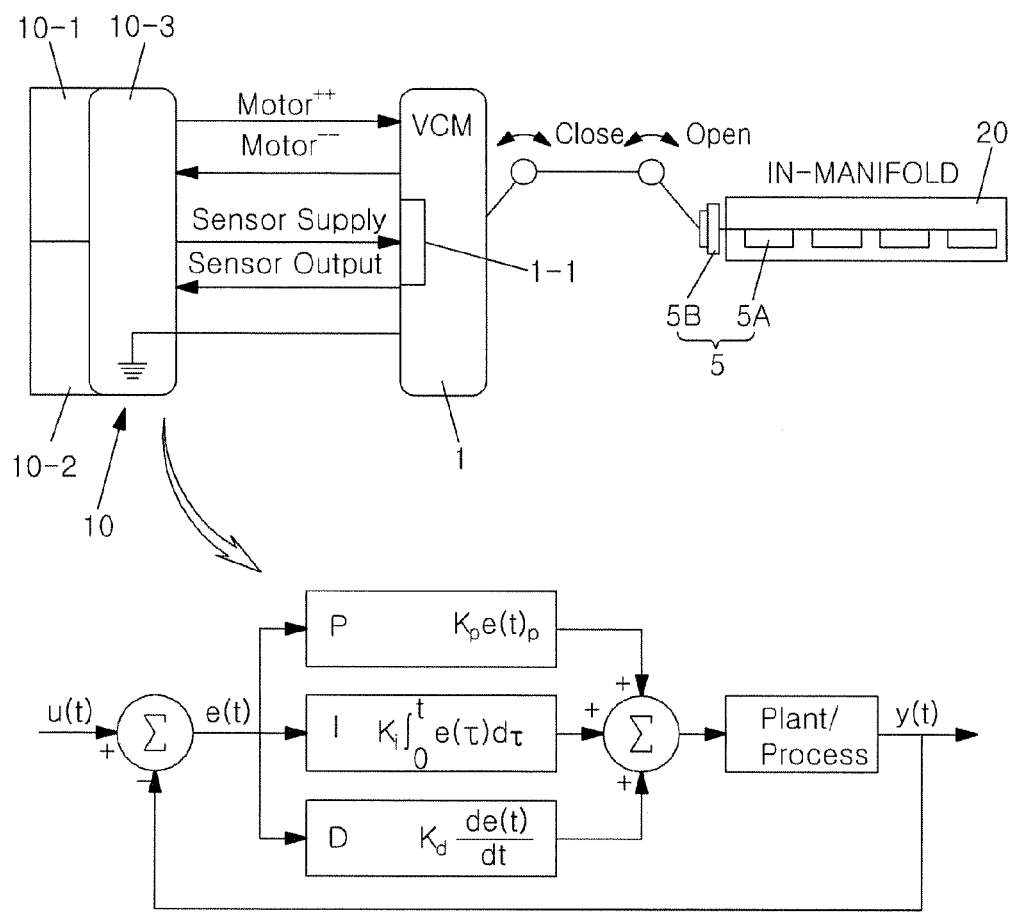
FIG. 2 is a view illustrating a configuration example of a variable charge motion system to which motor response control according to the embodiment of the present invention is applied.

FIG. 1 is a flowchart illustrating a motor response control method in a variable charge motion system according to an embodiment of the present invention. FIG. 2 is a view illustrating a configuration example of a variable charge motion system controlled by the motor response control method. Therefore, the motor response control method will be described through the variable charge motion system in FIG. 2.

Step S10 is included in certain embodiments. Reference numeral S10 refers to a step of beginning a VCM position learning logic, and the step is realized by a controller 10 for controlling a VCM motor 1. To this end, in certain embodiments, the controller 10 includes a VCM motor condition determination portion 10-1 which determines a VCM motor condition, a VCM mode processing portion 10-2 which determines a VCM control mode, and an interface 10-3 for outputting a PWM (Pulse Width Modulation) duty to the VCM motor 1, and detects a voltage detection value of the VCM motor 1 using a VCM motor sensor 1-1.

Step S20 is included in certain embodiments. Reference numeral S20 refers to a step of indentifying whether initial learning condition determination is performed, and, in certain embodiments, the controller 10 determines whether the VCM position of the VCM motor 1 is learned in step S20. Therefore, the process proceeds to step S40 when the VCM position is learned, but the process proceeds to step S30 when the VCM position is not learned, as the determination result of the initial learning condition in step S20.

Reference numeral 830 is a step in which the VCM position is learned through application of a VCM duty. To this end, the controller 10 outputs a PWM duty to the VCM motor 1 so that the VCM position is learned according to the operation of the VCM motor 1. In certain embodiments, the PWM duty is applied to be a VCM duty of 90%. In this case, the control of the VCM motor 1 by application of the VCM duty is realized by differential control (D) in a PID control block illustrated in FIG. 2.

Reference numeral S40 is a step of determining an engine condition after learning of the VCM position. To this end, the controller 10 detects an engine rotation speed in revolutions per minute (RPM) and compares whether the engine rotation speed in revolutions per minute is greater than a specific rotation speed in revolutions per minute (RPM). In this case, the specific rotation speed in revolutions per minute is set to be 1500 RPM.

Reference numeral S40-1 refers to a step of determining any response by the VCM motor to back pressure of intake air in an intake manifold due to a magnitude relation between the current engine rotation speed and the specific engine rotation speed.

The process proceeds to step S50 when the engine rotation speed in revolutions per minute is less than 1500 RPM as the determination result in step S40. In this case, the controller 10 switches over to a typical normal duty control mode and changes the PWM duty applied to the VCM motor 1 to be in a range of about 30% to 65% as in step S60. The typical normal duty control mode means that back pressure of intake air in an intake manifold 20 does not have an influence on a flap 5A connected to a valve arm 5B of a VCM valve 5. In certain embodiments, the back pressure of intake air is formed by outside air introduced from the atmosphere and EGR (Exhaust Gas Recirculation) gas supplied from exhaust gas.

On the other hand, the process proceeds to step S50-1 when the engine rotation speed in revolutions per minute is greater than 1500 RPM as the determination result in step S40. In this case, the controller 10 switches over to a rapid response duty control mode and changes the magnitude of the PWM duty applied to the VCM motor 1 as in step S60-1. Consequently, rapid response control has been performed when the VCM motor 1 reaches a target position under the influence of the back pressure of intake air.

In certain embodiments, a PWM duty application equation of the VCM motor 1 is set as follows:

PWM duty of VCM motor when VCM valve is closed=30%+[Fgas (resistance force by back pressure of intake air)] or PWM duty of VCM motor when VCM valve is opened=30%−[Fgas (additional force by back pressure of intake air)].

Here, [Fgas (resistance force by back pressure of intake air)] and [Fgas (additional force by back pressure of intake air)] change the magnitude of the PWM duty, so that the PWM duty applied has a magnitude of 30% or more or 30% or less.

Figure 3A:
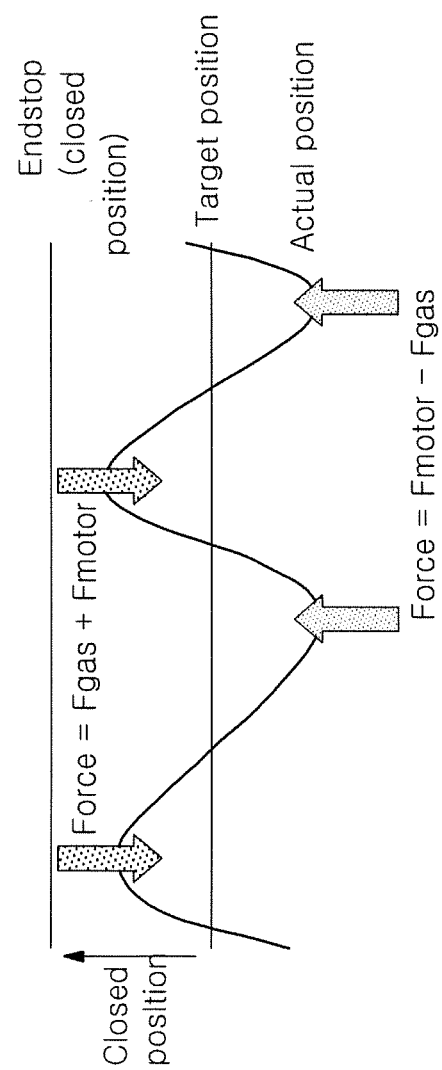

A method of applying the PWM duty application equation is indicated by a differential control example in FIG. 3A. In certain embodiments, the magnitude of Fgas is 10 Ncm in a range of 1500 to 2500 RPM (engine rotation speed in revolutions per minute), 13 Ncm in a range of 2500 to 3500 RPM (engine rotation speed in revolutions per minute), 18 Ncm in a range of 3500 to 4500 RPM (engine rotation speed in revolutions per minute), and 22 Ncm in a range of 4500 or more RPM (engine rotation speed in revolutions per minute). This arises from the fact that Fgas is calculated from a relation of pressure=force/cross section and intake air pressure is varied according to the engine rotation speed in revolutions per minute (RPM). For example, when intake air pressure=20 N/cm$^2$ (=2 bar=200 Kpa) and unit area of VCM valve 5 having flap radius of 13 cm=3.14×0.65×0.65, it is determined that Fgas=26.533 Ncm.

Therefore, in certain embodiments, the PWM duty of 30% is set as a criteria in the rapid response duty control mode, and the PWM duty magnitude of the VCM motor 1 is increased to be greater than 30% when the VCM valve 5 is closed so that the influence of Fgas for allowing the closing of the VCM valve 5 to be slow is overcome, whereas the PWM duty magnitude of the VCM motor 1 is decreased to be less than 30% when the VCM valve 5 is opened so that the influence of Fgas for allowing the opening of the VCM valve 5 to be fast is overcome. This result is indicated by a PID control characteristic result in FIG. 3B.

As described above, in the motor response control method in a variable charge motion system according to the embodiment of the present invention, the VCM motor 1 is differentially controlled by the PWM duty regardless of the back pressure of intake air in the intake manifold 20 when the current engine rotation speed in revolutions per minute is less than the specific engine rotation speed in revolutions per minute in the VCM position learning state by the controller 10, whereas the VCM motor 1 is differentially controlled by the PWM duty affected by the back pressure of intake air in the intake manifold 20 when the current engine rotation speed in revolutions per minute is greater than the specific engine rotation speed in revolutions per minute. Consequently, PWM duty signal vibration causing deterioration of the VCM motor response speed is resolved, and particularly the differential control PWM duty is increased or decreased in consideration of the closing and opening conditions of the VCM valve 5 so as to perform the rapid response control when the VCM motor reaches the target position.

In accordance with the exemplary embodiments of the present invention, since a VCM motor rapidly reaches a target position by a differential control PWM duty in consideration of disturbance conditions and a VCM valve connected to the VCM motor is rapidly operated, robustness of the VCM motor against noise or disturbance is significantly improved. In particular, operability relevant to response of a link type VCM can be significantly improved when the VCM motor is accelerated by improvement in response thereof.

In addition, the VCM motor can be prevented from being damaged by inhibiting excessive use of the PWM duty causing damage of coils of the VCM motor. Consequently, a customer satisfaction index on quality of the link type VCM can be significantly improved.

While the present invention has been described with respect to the specific embodiments, it will be apparent to those skilled in the art that various changes and modifications may be made without departing from the spirit and scope of the invention as defined in the following claims.

What is claimed is:

1. A motor response control method in a variable charge motion (VCM) system, comprising:
   checking an initial position of a VCM motor according to an operation of the VCM motor by a controller;
   applying a first PWM (Pulse Width Modulation) duty to the VCM motor and determining whether a current engine rotation speed in revolutions per minute is greater than a specific engine rotation speed in revolutions per minute in a VCM position checking completion state by the controller configured to differentially control the VCM motor;
   determining any response by the VCM motor to back pressure of intake air in an intake manifold due to a magnitude relation between the current engine rotation speed in revolutions per minute and the specific engine rotation speed in revolutions per minute;
   applying a typical normal PWM duty to the VCM motor when the current engine rotation speed in revolutions per minute is less than the specific engine rotation speed in revolutions per minute; and
   applying a rapid response PWM duty, based upon the determined back pressure of the intake air, to the VCM motor when the current engine rotation speed in revolutions per minute is greater than the specific engine rotation speed in revolutions per minute.

2. The motor response control method of claim 1, wherein the first PWM duty applied by the controller in the VCM position checking completion state is 90%.

3. The motor response control method of claim 1, wherein the specific engine rotation speed in revolutions per minute is 1500 RPM.

4. The motor response control method of claim 1, wherein the typical normal PWM duty has a magnitude of 30% to 65% PWM duty applied to the VCM motor.

5. The motor response control method of claim 1, wherein a magnitude of 30% PWM duty applied to the VCM motor is set as a criteria in the rapid response PWM duty, and the magnitude of the rapid response PWM duty is greater than the 30% PWM duty when the VCM motor closes a VCM valve installed on an intake air passage of the intake manifold whereas the magnitude of the rapid response PWM duty is less than the 30% PWM duty when the VCM motor opens the VCM valve.

6. The motor response control method of claim 5, wherein the magnitude of the PWM duty which is greater or less than the 30% PWM duty is varied according to the current engine rotation speed in revolutions per minute.

7. The motor response control method of claim 1, wherein the back pressure of the intake air is formed by a flow of outside air introduced from the atmosphere or a flow of outside air mixed with EGR (Exhaust Gas Recirculation) gas.

* * * * *